United States Patent [19]
Spradbury et al.

[11] Patent Number: 6,027,641
[45] Date of Patent: Feb. 22, 2000

[54] LIQUID SURFACE SKIMMER

[75] Inventors: Henry Peter Spradbury, deceased, late of Johannesburg, by Gerda Wilhelmina Mitchell, executrix; George Danks, Johannesburg, both of South Africa

[73] Assignees: Cornelia Johanna Spradbury; Anne Sutton, both of Johannesburg, South Africa

[21] Appl. No.: 08/873,409

[22] Filed: Jun. 12, 1997

Related U.S. Application Data

[63] Continuation-in-part of application No. 08/825,401, Mar. 27, 1997, abandoned, which is a continuation of application No. 08/562,360, Nov. 22, 1995, abandoned.

[30] Foreign Application Priority Data

Nov. 24, 1994 [ZA] South Africa .......................... 94/8700

[51] Int. Cl.[7] ................................ B01D 35/00; E04H 4/16
[52] U.S. Cl. ......................... 210/169; 210/242.1; 4/492; 137/578
[58] Field of Search ................................ 210/169, 242.1, 210/776; 137/578, 579; 4/492

[56] References Cited

U.S. PATENT DOCUMENTS

| | | |
|---|---|---|
| 2,207,378 | 7/1940 | Hinsch . |
| 3,616,916 | 11/1971 | Greene . |
| 4,501,659 | 2/1985 | Henk . |
| 4,746,424 | 5/1988 | Drew . |
| 4,818,389 | 4/1989 | Tobias et al. . |
| 5,238,585 | 8/1993 | Reed, Sr. . |
| 5,300,219 | 4/1994 | Braid . |
| 5,536,397 | 7/1996 | D'Offay . |

*Primary Examiner*—David A. Simmons
*Assistant Examiner*—Fred Prince
*Attorney, Agent, or Firm*—Darby & Darby

[57] ABSTRACT

A liquid surface skimmer consisting of an open topped cylindrical housing securable in a body of liquid and having a first inlet by way of a buoyant open ended sleeve movable in the housing, a transverse second inlet into the housing adjacent the bottom of the housing and an outlet opposite to and in line with the second inlet such that flow forced through the second inlet and into the outlet will draw liquid through the sleeve and thence through the outlet. The outlet has attached to it a debris trap extending to the housing preferably in the form of a net bag.

6 Claims, 2 Drawing Sheets

LIQUID SURFACE SKIMMER

RELATED APPLICATION

This application is a Continuation-in-Part of U.S. application Ser. No. 08/825,401 filed Mar. 27, 1997, now abandoned, which was a continuation of U.S. application Ser. No. 08/562,360 filed on Nov. 22, 1995 now abandoned.

FIELD OF THE INVENTION

This invention relates to a liquid surface skimmer and more particularly to a surface skimmer for swimming pools.

BACKGROUND TO THE INVENTION

In temperate, sub-tropical and tropical climates, swimming pools are common additions to dwellings. Unfortunately swimming pools require a considerable amount of maintenance much of which is concerned with the removal of debris, usually leaf or other vegetation litter, which falls into the pool.

Litter falling into a swimming pool can conveniently be divided into matter which sinks to the bottom of the pool and matter which floats on the surface of the pool. A wide range of pool cleaning devices have been developed to clean matter on the submerged surfaces of the pools and matter floating on the surface of a pool.

Matter floating on the surface of swimming pools is usually cleaned by draining the water over a trap arrangement which is located in or near the inlet of the swimming pool weir. In this manner water pumped through the pool's filters is drawn through the cleaner and skimmer.

Because these skimmers are located at the inlet of the weir they have a disadvantage in that they can clog or be rendered ineffective by leaf litter and other floating matter. In both instances the inlet, or in some cases a by-pass inlet to the pump can become constricted which can result in the pump overheating or adverse operating conditions for the pool cleaner can occur or both.

Various other proposals have been made to provide for surface skimming of a pool in order either to overcome disadvantages with the built-in type described above or to supplement them.

Thus, for example, Henk in U.S. Pat. No. 4,501,659 describes a surface skimmer which is fixed to the wall of a pool at the inlet for return water from a swimming pool filter and in this case the skimmer has a housing of sector-shape in cross-section with the flat face secured to the wall. The inlet for return water is jetted straight out of the outlet into an outlet arranged co-axially therewith in the bottom of the housing. A buoyant sleeve is arranged to have its periphery just below the water level so that the upper film of water flows into the housing via the sleeve. The upper end of the sleeve supports a net or basket for catching leaves and other debris flowing into the housing.

The disadvantages of this arrangement are firstly that the basket or net, being internally located, is severely limited as to its capacity unless the housing and sleeve are made to large proportions. Secondly, the jet of water emitted from the housing is directed straight out to the middle of the pool and this is considered to be undesirable, as it may disturb swimmers unnecessarily. Thirdly, the general flow of debris is from the centre of the pool towards the skimmer and there is substantially no flow along the side of the pool. Finally, because of the fact that the flat side of the housing is secured very close to the swimming pool wall, this provides a site for the growth of algae and accumulation of dirt which cannot be easily cleaned, save by removal of the housing completely.

Various other proposals have been put forward wherein the skimmer itself is attached by way of a long flexible suction pipe to either a swimming pool filter pump inlet or outlet to promote a flow of water through the skimmer and such skimmers move around the swimming pool generally completely arbitrarily. Such skimmers are not considered by applicant to be useful as they obstruct and impede swimmers and, in fact, can cause injury in the event that swimmers are not careful.

OBJECT OF THE INVENTION

It is an object of this invention to provide a liquid surface skimmer, and particularly to provide a surface skimmer for a swimming pool, which at least partly alleviates the above disadvantage.

SUMMARY OF THE INVENTION

In accordance with this invention there is provided a liquid surface skimmer comprising an open topped cylindrical housing receiving at least partially therein a positively buoyant open ended, axially movable sleeve, the housing having a first inlet defined by its open top and passing through the sleeve, a second inlet, and at least one outlet aligned with the second inlet to operatively draw liquid into the housing through the first inlet when the liquid under pressure flows through the second inlet towards the outlet, a collection trap releasably attached to the outlet exterior to the housing and wherein the axes of the second inlet and outlet extend transversely relative to the axis of the housing.

There is also provided for the buoyancy of the sleeve to be such that the first inlet is located in use in the surface film, alternatively immediately below the surface film, of a liquid into which the skimmer is placed.

Further features of the invention provide for the collection trap to be in the form of a net bag, preferably of elongate shape; for the liquid to be water preferably in a swimming pool; and for the second inlet to be connectable to an outlet for a swimming pool pump preferably with the axis of the second inlet extending at right angles to the axis of the swimming pool pump outlet.

Still further features of the invention provide for the housing and sleeve to be of substantially circular shape in cross-section; for the second inlet to have connection means for securing a pipe fitting thereto whereby the housing may be fixedly positioned in a swimming pool by pipe fittings connecting it to a swimming pool pump outlet.

The invention also provides a swimming pool having a surface skimmer as defined above and wherein the housing is mounted by way of pipe fittings to a return filtered water inlet in the sidewall of the pool, such that the housing is spaced from the adjacent wall thereof and with the axes of the second inlet and outlet extending in a roughly horizontal direction and substantially parallel to the adjacent wall of the swimming pool.

In order that the invention may be more fully understood, one embodiment thereof will now be described with reference to the accompanying drawings.

DETAILED DESCRIPTION WITH REFERENCE TO THE DRAWINGS

Figure 1:
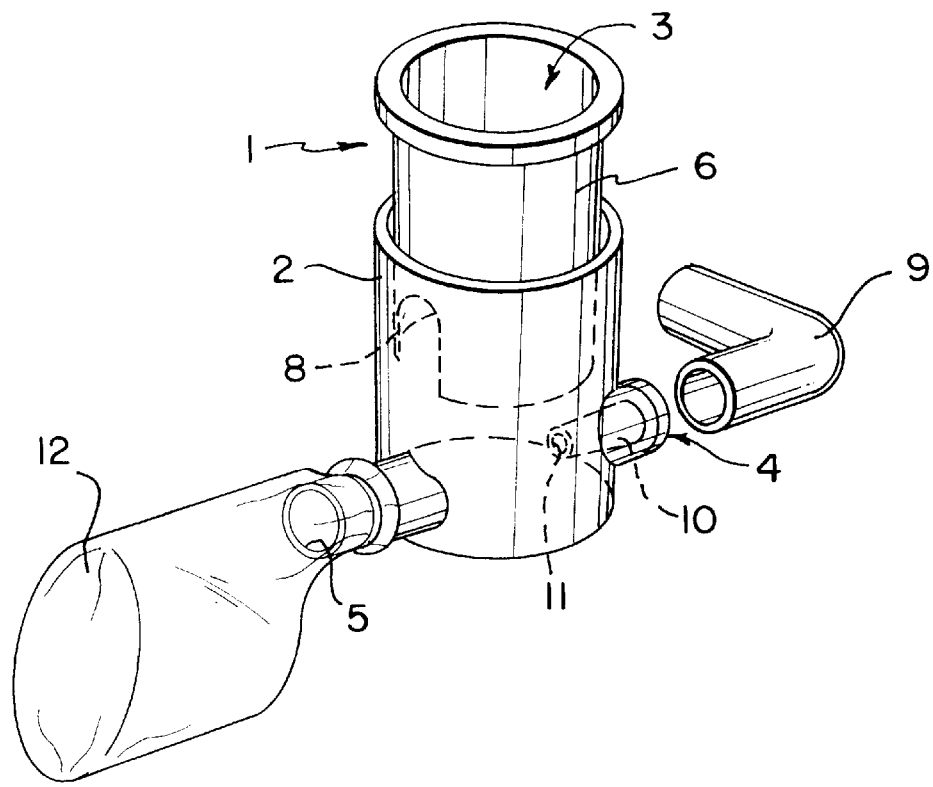
FIG. 1 is an isometric view of one embodiment of a liquid surface simmer according to the invention.
Figure 2:
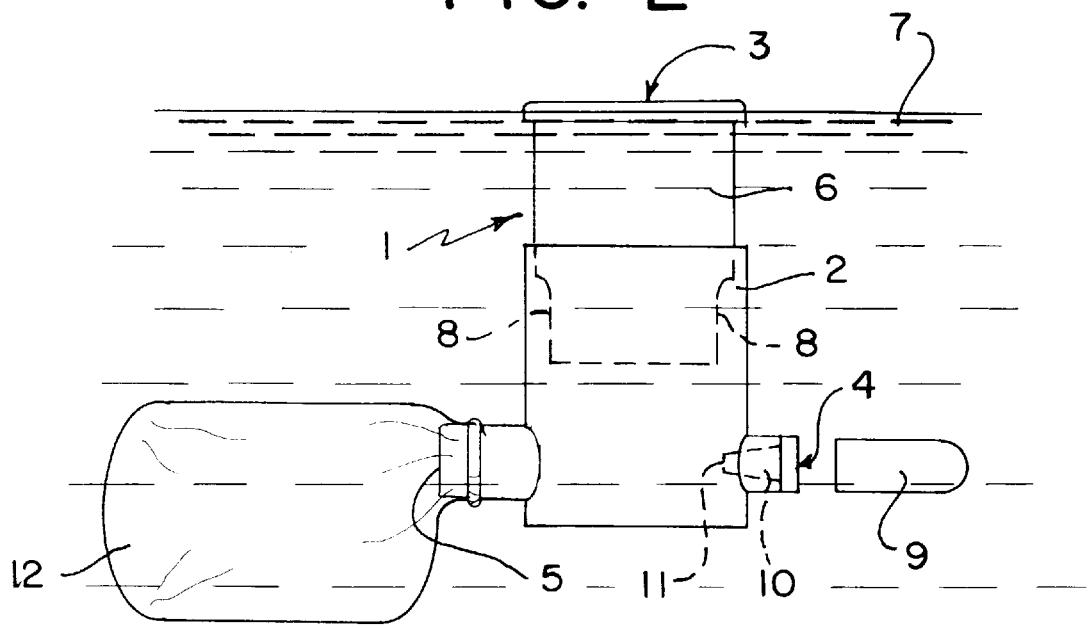
FIG. 2 is a side view of the embodiment of the liquid surface skimmer of FIG. 1.

Referring to the drawings, a liquid surface skimmer (1) comprises an open topped cylindrical housing (2), the open top of which defines a first inlet (3). A second inlet (4) and at least one outlet (5) are located in a lower region of the housing with their axes collinearly arrange and extending at right angle to the axis of the housing. The outlet (5) is co-operable with the second inlet (4) to draw liquid by venturi action into the housing through the first inlet (3) when liquid under pressure flows through the second inlet (4) and into the outlet (5).

In the embodiment of the invention illustrated the housing receives a positively buoyant, axially slidable, open ended sleeve (6) which forms a liner and extension to the first inlet (3). The sleeve (6) is fabricated from a positively buoyant plastics material and arranged so that in use it is located in the surface film of a liquid (7). It has cutouts (8) in the lower end of the wall thereof so that the sleeve can rest on the bottom of the housing with the second inlet and outlet aligned with the cutouts. The sleeve does not therefore interfere with the operation of the skimmer and it can rise by substantially its full height while being constrained in the housing (2).

The second inlet (4) is connectable to an outlet of a filter pump (now shown) by way of one or more pipe fittings (9) as will be further described below.

This inlet (4) also has an inwardly directed nozzle (10), the outlet (11) of which has a reduced cross-sectional area relative to the inlet and outlet. The outlet (5) is located opposite the nozzle (10) so that in use, liquid ejected from the nozzle (10) towards the outlet (5) acts to draw liquid in through the open topped housing or first inlet (3). This causes water to be drawn from the surface film (7) into the housing (2) over the upper edge of the buoyant sleeve. A net collection bag (12) is secured to the outlet (5) from the housing on the exterior thereof. This collection bag is preferably of elongate shape in the axial direction of the outlet.

In use, liquid flowing out of the second inlet (4) towards the outlet (5) will draw liquid from the surface film (7) into the housing through the first inlet (3) and sleeve and, in so doing, will draw floating matter into the housing. This debris will then be moved out through the outlet (5) where it will collect in the bag (12). When the bag (12) is full it can be removed and emptied.

In this embodiment the liquid surface skimmer is of circular cylindrical shape and is particularly intended for use in swimming pools. It is envisaged that because the skimmer is connectable to the outlet from the filtration apparatus the effect of the net clogging with leaf litter on the swimming pool pump will be minimal. This so because in the event that the net does clog, water pumped into the housing can flow out of the housing through the first inlet.

It will be understood that in use the housing (2) will be secured in position by connecting it to the pump outlet (13) at the pool wall (14) by way of any suitable pipe fittings (15).

Figure 3:
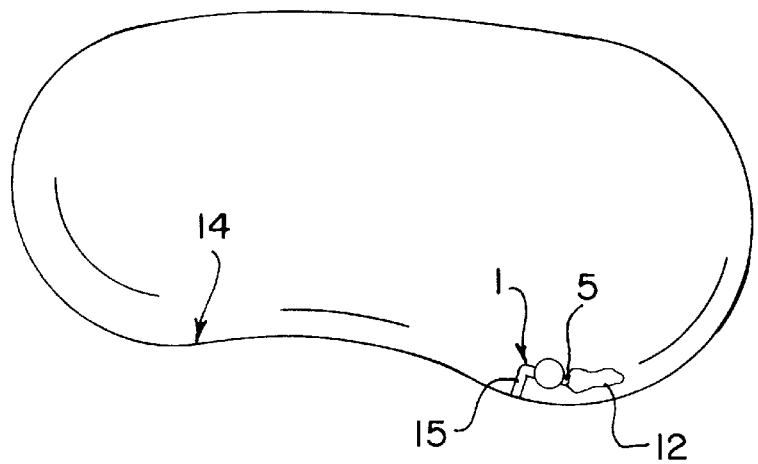
FIG. 3 is a schematic plan view of a pool fitted with the skimmer of the invention.

The use of pipe fittings (15) provides an extremely versatile means of connecting the skimmer to a pump outlet into the swimming pool and, depending on the exact location of the outlet (13), it may or may not be necessary to provide means for adjusting the vertical position of the housing in the pool. Thus, the housing could be connected directly to the outlet (13) by a single pipe fitting which preferably is an elbow such that, as illustrated in FIG. 3, the outlet (5) and collection bag (12) are directed substantially parallel to the pool wall (14) where the skimmer (1) is located. It is to be noted that in its installed position, the housing is spaced from the swimming pool wall which enables cleaning to take place and also, this feature combined with the fact that the housing is circular and that water can flow into it from all directions on the surface, a substantially more efficient cleaning action is provided.

Furthermore the direction of the water leaving the skimmer, being substantially horizontal and parallel to the pool wall, creates a gentle circular motion to the water which assists in encouraging floating debris to move around the pool and towards the skimmer.

Figure 4:
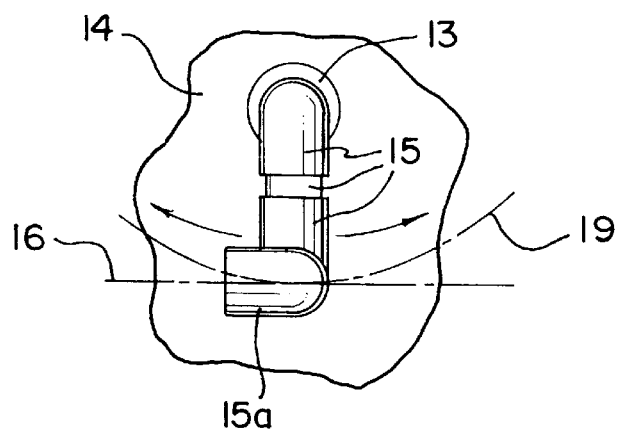
FIG. 4 is a schematic isometric illustration showing the height adjustment which can be achieved; and, FIG. 5 is an elevation of the pipe arrangement shown in FIG. 4.
Figure 5:
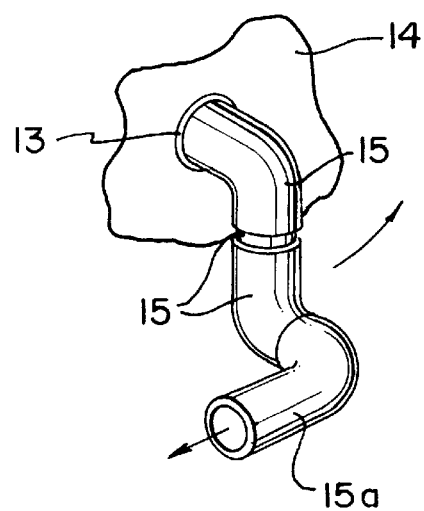

Referring particularly to FIGS. 4 and 5, there is illustrated an arrangement of pipe fitting which provides great versatility for adjusting the height of the housing in the water. The arrangement of pipe elbows is such that the lowermost elbow (15a), which is attached to the second inlet to the housing, can maintain its axis (16) in a horizontal position, whilst the region of the assembly, which is in a vertical plane, can be rotated about the axis of the pump outlet (13) such that the axis of the lowermost elbow (15a) follows a circular path indicated by dotted line (17). The housing can thus be located at any suitable height.

In this manner the housing may be located sufficiently below the pool surface to give the sleeve a floating range from the surface of substantially its full height when the pool in which it is placed is filled to maximum level. This enables the skimmer to remain effective until the pool level drops to lower the sleeve (6) to a position in which its full length is received within the housing (2).

Other advantages will readily be perceived from the construction above described. While the housing is connected directly to the inlet into the pool, the use of the elbows also ensures that any slope of the pool wall will not prevent the optimum positioning of the housing. The elbow connections also enables the flow through the housing to be directed such that the skimming effect can be optimised in relation to the slope of the pool. Also removal and replacement of the pool skimmer is facilitated by this construction.

It will be appreciated that variations can be made to the embodiment of the invention as described above without departing from the scope thereof. In particular, the arrangement of the second inlet and outlet can be varied as can the shape and configuration of the housing and nozzle.

What is claimed as new and desired to be secured by Letters Patent is:

1. A liquid containing pool having a wall and fitted with a liquid surface skimmer, said skimmer comprising an open topped cylindrical housing mounted on said wall receiving at least partially therein a positively buoyant open ended, axially movable sleeve, the housing having a first inlet defined by its open top and passing through the sleeve, a second inlet and at least one outlet aligned with the second inlet to operatively draw liquid into the housing through the first inlet when the liquid under pressure flows through the second inlet towards the outlet, the second inlet and outlet having axes which are relatively positioned so that the flow of the liquid under pressure is transverse relative to the axis of the housing and is also along the wall, whereby a swirling movement of liquid in the pool is produced, the skimmer being mounted to an outlet into the swimming pool from a filtration pump via at least one fitting constructed to provide for any required height adjustment of the housing.

2. A liquid surface skimmer as defined in claim 1 wherein the buoyancy of the sleeve is such that the first inlet will, in use, be located in the surface film of the liquid in which the skimmer is located.

3. A liquid skimmer as defined in claim 1 further comprising a collection trap including a net bag releasably attached to the outlet exterior of the housing.

4. A liquid skimmer as defined in claim 1 wherein the housing is adapted for connection through the second inlet to an outlet into a swimming pool from the pool filtration pump.

5. A liquid skimmer as claimed in claim 1 in which the housing and sleeve are of circular shape in cross-section.

6. A swimming pool as claimed in claim 1 in which the housing is spaced apart from the said adjacent part of the wall.

* * * * *